(No Model.)

J. COOK.
Earthenware Stew Pan.

No. 240,891.  Patented May 3, 1881.

Witnesses:
C. F. Wagoner
Dayton A. Doyle

Inventor:
Joseph Cook,
by C. R. Humphrey
his Atty.

UNITED STATES PATENT OFFICE.

JOSEPH COOK, OF AKRON, OHIO, ASSIGNOR OF ONE-HALF TO HENRY A. GIBBS, OF SAME PLACE.

EARTHENWARE STEW-PAN.

SPECIFICATION forming part of Letters Patent No. 240,891, dated May 3, 1881.

Application filed December 13, 1880. (No model.)

*To all whom it may concern:*

Be it known that I, JOSEPH COOK, of Akron, in the county of Summit and State of Ohio, have invented a new and useful Improvement in Earthenware Stew-Pans, of which the following is a specification.

My invention has relation to that class of earthenware vessels used for culinary purposes, as a substitute for metallic vessels, wherein articles may be cooked over a fire or stove. The use of earthenware vessels as cooking-utensils is of great antiquity. Recently improvements have been made in such vessels to specially adapt them to such purpose. Such improvements have consisted in the addition of a bail, attached by lugs, ears, or other equivalent device, and the addition of feet, legs, or a projecting rim, whereon the vessel rests. The objection to these devices is that the projecting feet, ears, or lugs are liable to break off, either by accident or heat, or the vessels rest directly upon the stove and are liable to crack from sudden heat, in either event entailing a loss of the entire vessel.

The object of my invention is to produce an earthenware vessel having all the advantages of those hereinbefore referred to, but without the objections before stated.

It consists in a metallic frame provided with a suitable bail and adapted to receive and fit an earthenware vessel, so arranged that the vessel may be readily removed therefrom or replaced therein; and it further consists in arranging a part of the frame to extend between the vessel and stove to hold the vessel a short distance therefrom.

Figure 1:
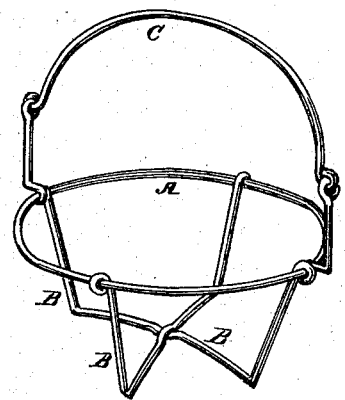
Figure 2:
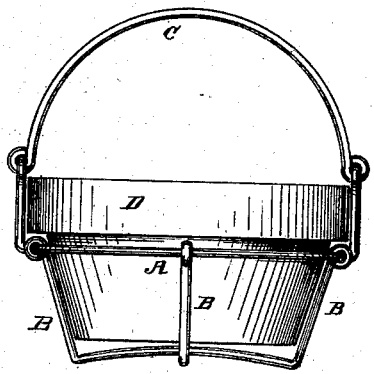

One form of my invention is illustrated in the accompanying drawings, wherein Figure 1 is a wire frame consisting of the hoop A, supporting-wires B, and bail C; and Fig. 2, the same with a common earthenware pan therein.

The frame is so constructed that the earthen pan can be readily removed therefrom for cleaning, and if broken another can be substituted. The wires B B curve upward under the vessel and serve as feet to raise it some distance from the stove.

I do not confine my invention to the exact devices here shown, as the frame may be of cast metal and the shape modified; but

What I claim is—

1. In combination with an earthenware vessel, a metallic frame-work adapted to receive and fit said vessel, provided with a bail, and consisting of a hoop to surround said vessel near its top, and one or more loops depending from said hoop and passing beneath the vessel, substantially as and for the purpose hereinbefore set forth.

2. In combination with an earthenware vessel, a metallic frame-work adapted to receive and fit said vessel, provided with a bail, and consisting of a hoop to surround said vessel near its top, with one or more loops depending from said hoop, passing beneath said vessel, and adapted to sustain the same a short distance above the plane whereon the frame-work rests, substantially as shown, for the purpose specified.

3. As a new article of manufacture, a metallic basket provided with a bail, and consisting of an upper hoop with two or more loops depending therefrom and adapted to pass beneath an earthenware vessel to be placed therein.

In testimony that I claim the foregoing I have hereunto set my hand this 9th day of December, A. D. 1880.

JOSEPH COOK.

Witnesses:
 C. P. HUMPHREY,
 DAYTON A. DOYLE.